(12) United States Patent
Moses

(10) Patent No.: US 8,386,164 B1
(45) Date of Patent: Feb. 26, 2013

(54) LOCATING LDAR COMPONENTS USING POSITION COORDINATES

(75) Inventor: Rex Moses, Nassau Bay, TX (US)

(73) Assignee: LDARtools, Inc., League City, TX (US)

(*) Notice: Subject to any disclaimer, the term of this patent is extended or adjusted under 35 U.S.C. 154(b) by 1299 days.

(21) Appl. No.: 12/121,705

(22) Filed: May 15, 2008

(51) Int. Cl.
G01S 1/00 (2006.01)
G06F 17/00 (2006.01)
G06F 7/00 (2006.01)

(52) U.S. Cl. ........ 701/409; 701/466; 701/468; 701/532; 701/300; 340/995.18; 340/995.19; 707/609

(58) Field of Classification Search ............... 701/400, 701/408, 409, 430, 431, 433, 438, 439, 440, 701/442, 445, 450, 451, 453, 461, 462, 468, 701/469, 470, 471, 475, 486, 487, 495, 516, 701/517, 518, 522, 532, 533, 538, 540, 300, 701/466, 491; 340/995.1, 995.14, 995.18, 340/995.19, 995.24; 707/609
See application file for complete search history.

(56) References Cited

U.S. PATENT DOCUMENTS

| 3,853,455 | A | 12/1974 | Riordan et al. |
|---|---|---|---|
| 3,985,509 | A | 10/1976 | Trone et al. |
| 4,346,055 | A | 8/1982 | Murphy et al. |
| H572 | H | 2/1989 | Hansen |
| 5,206,818 | A | 4/1993 | Speranza |
| 5,356,594 | A | 10/1994 | Neel et al. |
| 6,341,287 | B1 | 1/2002 | Sziklai et al. |
| 6,438,535 | B1 | 8/2002 | Benjamin et al. |
| 6,478,849 | B1 | 11/2002 | Taylor et al. |
| 6,545,278 | B1 | 4/2003 | Mottier et al. |
| 6,549,916 | B1 | 4/2003 | Sedlar |
| 6,609,090 | B1 | 8/2003 | Hickman et al. |
| 6,672,129 | B1 | 1/2004 | Frederickson et al. |
| 6,680,778 | B2 * | 1/2004 | Hinnrichs et al. ............ 356/437 |
| 6,722,185 | B2 | 4/2004 | Lawson et al. |
| 6,771,744 | B1 | 8/2004 | Smith et al. |
| 7,017,386 | B2 | 3/2006 | Liu et al. |
| 7,089,530 | B1 | 8/2006 | Dardinski et al. |
| 7,103,610 | B2 | 9/2006 | Johnson et al. |
| 7,136,904 | B2 | 11/2006 | Bartek et al. |
| 7,330,768 | B2 | 2/2008 | Scott et al. |
| 7,356,703 | B2 | 4/2008 | Chebolu et al. |
| 7,369,945 | B2 | 5/2008 | Miller et al. |
| 7,437,362 | B1 | 10/2008 | Ben-Natan |

(Continued)

FOREIGN PATENT DOCUMENTS

WO 2006-022648 A1 3/2006

OTHER PUBLICATIONS

Office Action (Aug 4, 2009); U.S. Appl. No. 12/032,499 (Moses, et al).

(Continued)

*Primary Examiner* — Thomas Tarcza
*Assistant Examiner* — Edward Pipala
(74) *Attorney, Agent, or Firm* — Pramudji Law Group PLLC; Ari Pramudji (57) ABSTRACT

Various technologies and techniques directed to creating, encrypting, and updating a database of position coordinates of LDAR components. In one implementation, the method for creating a database of coordinates of leak detection and repair (LDAR) components includes receiving an input pertaining to an LDAR component, obtaining position coordinates of a handheld computer device and associating the position coordinates of the handheld computer device with the LDAR component.

28 Claims, 4 Drawing Sheets

U.S. PATENT DOCUMENTS

| | | | |
|---|---|---|---|
| 7,588,726 B1 | 9/2009 | Mouradian et al. | |
| 7,657,384 B1 | 2/2010 | Moses | |
| 7,840,366 B1 | 11/2010 | Moses et al. | |
| 7,851,758 B1* | 12/2010 | Scanlon et al. | 250/330 |
| 2002/0026339 A1 | 2/2002 | Frankland et al. | |
| 2002/0080032 A1 | 6/2002 | Smith et al. | |
| 2002/0094498 A1 | 7/2002 | Rodriguez-Rodriguez et al. | |
| 2003/0012696 A1 | 1/2003 | Millancourt | |
| 2003/0081214 A1 | 5/2003 | Mestha et al. | |
| 2003/0085714 A1 | 5/2003 | Keyes et al. | |
| 2003/0217101 A1 | 11/2003 | Sinn | |
| 2004/0059539 A1 | 3/2004 | Otsuki et al. | |
| 2004/0226345 A1 | 11/2004 | McCoy et al. | |
| 2004/0258213 A1 | 12/2004 | Beamon et al. | |
| 2005/0000981 A1 | 1/2005 | Peng et al. | |
| 2005/0005167 A1 | 1/2005 | Kelly et al. | |
| 2005/0053104 A1 | 3/2005 | Kulp et al. | |
| 2005/0060392 A1 | 3/2005 | Goring et al. | |
| 2005/0117641 A1 | 6/2005 | Xu et al. | |
| 2005/0234934 A1 | 10/2005 | Mackay et al. | |
| 2005/0246112 A1* | 11/2005 | Abhulimen et al. | 702/51 |
| 2005/0262995 A1 | 12/2005 | Kilkis | |
| 2005/0275556 A1 | 12/2005 | Brown | |
| 2006/0020186 A1 | 1/2006 | Brister et al. | |
| 2006/0220888 A1 | 10/2006 | Germouni et al. | |
| 2006/0235611 A1* | 10/2006 | Deaton et al. | 701/207 |
| 2006/0286945 A1 | 12/2006 | Reznik et al. | |
| 2007/0000310 A1 | 1/2007 | Yamartino et al. | |
| 2007/0004381 A1 | 1/2007 | Larson et al. | |
| 2007/0139183 A1* | 6/2007 | Kates | 340/521 |
| 2007/0299953 A1 | 12/2007 | Walker et al. | |
| 2008/0021717 A1 | 1/2008 | Kaartinen et al. | |
| 2008/0063298 A1 | 3/2008 | Zhou et al. | |
| 2008/0092625 A1* | 4/2008 | Hinnrichs | 73/23.2 |
| 2008/0120043 A1 | 5/2008 | Miller et al. | |
| 2008/0231719 A1 | 9/2008 | Benson et al. | |

OTHER PUBLICATIONS

USPTO Office Action (Jan. 24, 2012)—U.S. Appl. No. 12/814,265 (Moses).
Response to Office Action (Mar. 21, 2011), Office Action (Dec. 21, 2010), RCE (Sep. 27, 2010), Advisory Action (Sep. 10, 2010); U.S. Appl. No. 11/668,367 (Skiba, et al).
Response After Final (May 23, 2011), Final Office Action (Mar. 22, 2011), Response to Office Action (Dec. 27, 2010); U.S. Appl. No. 12/133,920 (Moses, et al).
"Bluetooth Tutorial—Specifications"; Palo Wireless: Bluetooth Resource Center [online]; Jan. 5, 2006; retrieved Dec. 23, 2009 via Internet Archive Wayback Machine.
USPTO Allowance (Jun. 8, 2011); U.S. Appl. No. 11/668,367 (Skiba, et al).
RCE Amendment (Jun. 22, 2011) and USPTO Advisory Action (Jun. 7, 2011); U.S. Appl. No. 12/133,920 (Moses, et al).
Response to Office Action (Aug. 29, 2011), USPTO Office Action (May 27, 2011); U.S. Appl. No. 12/474,504 (Bolinger, et al).
"2nd Annual Fugitive Emissions—Leak Detection and Repair Symposium"; ISA Technical Conference Brochure; Nov. 2002.
"Introducing the Allegro CX(TM) Field Computer"; Product Newswire (product announcement); Jun. 21, 2004.
"New from Accutech, Wireless Acoustic Monitor Field Units Make Fugitive Emissions Monitoring Compliance Easy"; Product Announcement/Description; Feb. 10, 2004.
"LDARManager™ Makes Fugitive Emission Monitoring a Breeze TISCOR launches its newest product for Leak Detection and Repair"; product announcement/description; Nov. 8, 2002.
Environmental Analytics, Inc. v. TMX2, Inc. and LDAR Solutions, Ltd.; Case 4:08-cv-03353; USDC, Southern District of Texas; First Amended Complaint; Dec. 10, 2008.
Response/Amendment After Final (Aug. 24, 2010); Final Office Action (Jun. 25, 2010); Response to Office Action (Apr. 26, 2010); and Office Action (Jan. 25, 2010); U.S. Appl. No. 11/668,367 (Skiba, et al).
Response to Office Action (Jul. 13, 2010); Office Action (Apr. 14, 2010); Response/Amendment After Final (Mar. 29, 2010); Final Office Action (Jan. 29, 2010); Response to Office Action (Nov. 4, 2009); and Office Action (Aug. 4, 2010); U.S. Appl. No. 12/032,499 (Moses, et al).
Office Action (Sep. 27, 2010); U.S. Appl. No. 12/133,920 (Moses, et al).
Response to Office Action (Feb. 21, 2012) and USPTO Office Action (Nov. 18, 2011); U.S. Appl. No. 12/359,196 (Moses, et al.).
USPTO Final Action (Jul. 12, 2012) and Response to Office Action (Apr. 24, 2012); U.S. Appl. No. 12/814,265 (Moses).

\* cited by examiner

LOCATING LDAR COMPONENTS USING POSITION COORDINATES

BACKGROUND

1. Field of the Invention

Implementations of various technologies described herein generally relate to various methods and/or systems for locating components in a Leak Detection And Repair (LDAR) program.

2. Description of the Related Art

The following descriptions and examples do not constitute an admission as prior art by virtue of their inclusion within this section.

Industrial plants that handle volatile organic compounds (VOCs) sometimes experience unwanted emissions of those compounds into the atmosphere from point sources, such as smokestacks, and non-point sources, such as valves, pumps, and/or vessels containing the VOCs. Emissions from non-point sources typically occur due to leakage of the VOCs from joints and/or seals and may be referred to herein as "fugitive emissions". Fugitive emissions from valves typically occur as leakage through the packing set around the valve stem.

Most industrial plants have established an LDAR program to detect if any fugitive emissions are being released into the atmosphere. Given the obscure locations of many of these potential emission sources, technicians usually experience major difficulties in locating all of the LDAR components.

Further, there are security risks involved with storing the locations of hazardous gas/chemical equipment where LDAR components are positioned on an unsecured database.

SUMMARY

Described herein are one or more implementations of various technologies and techniques directed to creating, encrypting, and updating a database of position coordinates of LDAR components. In one implementation, the method for creating a database of coordinates of leak detection and repair (LDAR) components includes receiving an input pertaining to an LDAR component, obtaining position coordinates of a handheld computer device in response to receiving the input and associating the position coordinates of the handheld computer device with the LDAR component.

Described herein are also one or more implementations of various techniques for using the position coordinates to assist a user (technician) to locate an LDAR component in the field. In one implementation, the method for providing assistance to a user for locating a leak detection and repair (LDAR) component includes receiving a request to locate an LDAR component in a field, retrieving position coordinates of the LDAR component, obtaining position coordinates of a handheld computer device and providing directions from the position coordinates of the handheld computer device to the position coordinates of the LDAR component.

In one implementation, the method may further include obtaining current position coordinates of the handheld computer device when the user has reached the LDAR component, determining whether the current position coordinates are within a predetermined range of the retrieved position coordinates of the LDAR component and whether the dilution of precision of the current position coordinates are higher than the dilution of precision of the retrieved position coordinates, and if it is determined that the current position coordinates are within the predetermined range and that the dilution of precision of the current position coordinates are higher than the dilution of precision of the retrieved position coordinates, then replacing the retrieved position coordinates of the LDAR component with the current position coordinates.

Described herein are also one or more implementations of various techniques for a system for locating leak detection and repair (LDAR) components. In one implementation, the system includes one or more position coordinates satellites and a handheld computer device in communication with the position coordinates satellite. The handheld computer device includes a processor and a memory comprising program instructions executable by the processor to: receive an input pertaining to an LDAR component, obtain position coordinates of the handheld computer device using the position coordinates satellites and associate the position coordinates of the handheld computer device with the LDAR component.

In another implementation, the system includes a position coordinates satellite and a handheld computer device in communication with the position coordinates satellite. The handheld computer device includes a processor and a memory comprising program instructions executable by the processor to: receive a request to locate an LDAR component in a field, retrieve position coordinates of the LDAR component in response to receiving the request, obtain position coordinates of the handheld computer device using one or more position coordinates satellites and provide directions from the position coordinates of the handheld computer device to the position coordinates of the LDAR component.

The above referenced summary section is provided to introduce a selection of concepts in a simplified form that are further described below in the detailed description section. The summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

Implementations of various technologies will hereafter be described with reference to the accompanying drawings. It should be understood, however, that the accompanying drawings illustrate only the various implementations described herein and are not meant to limit the scope of various technologies described herein.

DETAILED DESCRIPTION

The discussion below is directed to certain specific implementations. It is to be understood that the discussion below is only for the purpose of enabling a person with ordinary skill in the art to make and use any subject matter defined now or later by the patent "claims" found in any issued patent herein.

The following paragraphs generally describe one or more implementations of various techniques directed to acquiring position coordinates of LDAR components and providing a user with a method in which to locate the immediate vicinity or the precise location of an LDAR component. In one implementation, the LDAR component locator system may include an LDAR component, a global positioning system device, one or more position coordinates satellites in communication with a PDA, a database of LDAR component information, and a database of position coordinates.

In operation, a user may perform monitoring, documenting, or maintenance work at each LDAR component. After the user has completed his maintenance work at one LDAR component, he may input an account of the work that he completed into his PDA. Upon receiving this information about a specific LDAR component, the PDA may retrieve its own position coordinates, encrypt it, and store it as the position coordinates for the specified LDAR component on a database for position coordinates. In order to keep the location of the LDAR components safe from sabotage, the component locator program may encrypt the position coordinates prior to storing them to the database. Further, the encrypted position coordinates may be stored in a database separate from the database that stores other information pertaining to LDAR components.

After an LDAR component's position coordinates have been stored, a user may request to locate the LDAR component on his PDA. Upon receiving a request to locate a specific LDAR component, the PDA may download the LDAR component's position coordinates, decrypt it, and compare it to its own current position coordinates. Using the two coordinates, the PDA may provide the user with a map or step-by-step directions on how to reach the vicinity of the specified LDAR component.

The accuracy of an LDAR component's location may be determined each time an LDAR component has been located by a user. If an LDAR component's newly acquired location coordinates are within a predetermined accuracy tolerance, the newly acquired coordinates may be stored in the database of the position coordinates in place of the previous coordinates for the LDAR component. Otherwise, if an LDAR component's newly acquired location coordinates exceed a predetermined accuracy tolerance, the PDA may display a warning notice to its user. The user may have the option to either replace the previously stored position coordinates with the newly acquired coordinates, or he may disregard the warning and keep the previously stored position coordinates on the database.

In one implementation, the component locator program may also determine the accuracy of a location by comparing the dilution of precision values between the position coordinates stored on the database and the PDA's newly acquired position coordinates. The dilution of precision may be calculated by determining the number of GPS satellites used in locating the PDA's position coordinates. If the newly acquired coordinates have a higher degree of precision than the previously stored coordinates, the component locator program may replace the previously stored coordinates with the newly acquired coordinates.

One or more implementations of various techniques for an LDAR component locator system will now be described in more detail with reference to FIGS. 1-4 in the following paragraphs.

Figure 1:
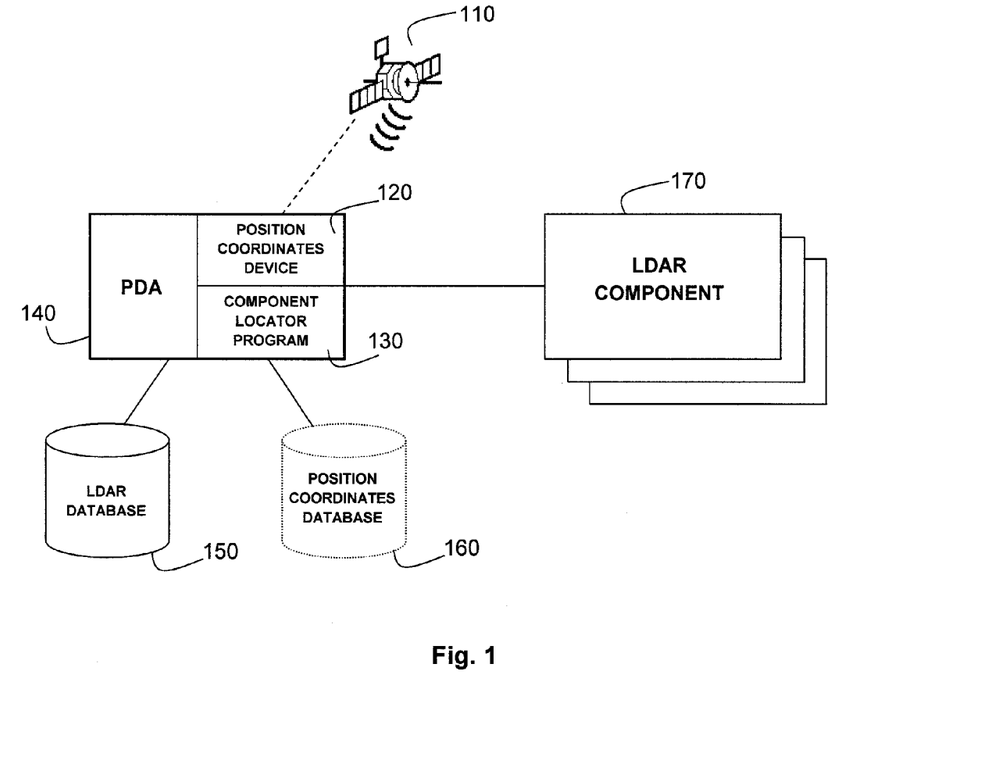
FIG. 1 illustrates a schematic diagram of an LDAR component locator system in accordance with one or more implementations of various technologies and techniques described herein.

FIG. 1 illustrates a block diagram of a system or network 100 that may be used to locate LDAR components in accordance with one or more implementations of various technologies and techniques described herein.

The system 100 may include a computer device, such as a personal digital assistant (PDA) 140, in communication with a position coordinates satellite 110, LDAR components 170, a database 150 for storing LDAR information and a database 160 for storing position coordinates of the LDAR components 170. LDAR components 170 may include devices such as valves, pumps, compressors, connectors, flanges, and other devices that can be found at industrial plants.

The PDA 140 may be configured for storing the hardware and software elements required to locate specific components. For instance, the PDA 140 may include hardware components, such as a position coordinates device 120, and software components, such as a component locator program 130.

The position coordinates device 120 may be used to assist position satellite 110 in obtaining the position coordinates of PDA 140. The position coordinates device 120 may be any device that communicates with a position coordinates satellite 110 to determine its position coordinates. The satellite 110 may be configured to provide the position coordinates device 120 its position coordinates. Although only one position coordinates satellite is shown in FIG. 1, it should be understood that in some implementations the satellite 110 may include one or more medium Earth orbit satellites. In one implementation, the position coordinates device 120 may use Global Positioning System (GPS) satellites to determine the PDA 140's GPS coordinates. It should also be noted that satellite 110 may be replaced with other communications devices such as cellular phone towers or any other device that may be capable to provide position coordinates of the PDA 140.

The component locator program 130 may be used to store the position coordinates of the LDAR components 170 into a database and to assist the user in locating LDAR components 170. In one implementation, the component locator program 130 may link or associate an LDAR component 170 with its corresponding position coordinates obtained by the position coordinate device 120. After making this association, the component locator program 130 may encrypt the position coordinates and store them in the position coordinates database 160. The component locator program 130 may be described in more detail with reference to FIGS. 3 and 4 in the following paragraphs.

The position coordinates database 160 may be configured to store position coordinates of each LDAR component 170. The position coordinates database 160 may be located on a server, personal computer, or other similar computer medium.

The database 150 may be configured to store LDAR component information, such as tag number, size, component type and process stream information. Like the position coordinates database 160, database 150 may also be located on a server, personal computer, or other similar computer medium.

Although various implementations described herein are with reference to a PDA, it should be understood that in some implementations the PDA 140 may be substituted with any other computer device that can utilize software programs, communicate wirelessly with other computer media, and interface with a position coordinates device 120, such as a laptop, Pocket PC, and the like.

Figure 2:
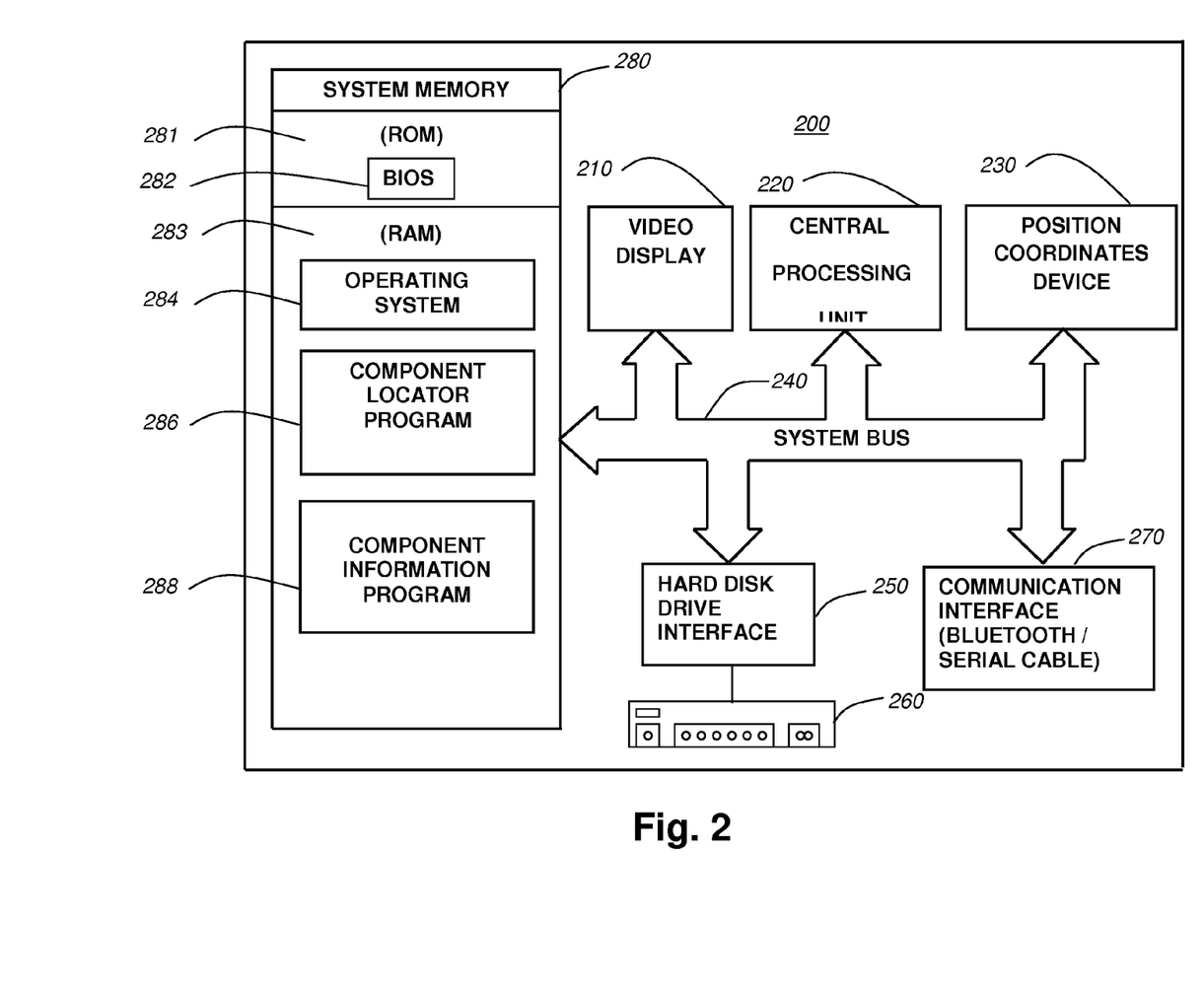
FIG. 2 illustrates a schematic diagram of a personal digital assistant (PDA) in accordance with one or more implementations of various technologies and techniques described herein.

FIG. 2 illustrates a schematic diagram of a PDA 200 in accordance with one or more implementations of various technologies described herein. The PDA 200 may include a central processing unit (CPU) 220, a system memory 280, and a system bus 240 that couples various system components including the system memory 280 to the CPU 220. Although only one CPU 220 is illustrated in FIG. 2, it should be understood that in some implementations the PDA 200 may include more than one CPU. The system bus 240 may be any of several types of bus structures, including a memory bus or memory controller, a peripheral bus, and a local bus using any of a variety of bus architectures. By way of example, and not limitation, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. The system memory 280 may include a read only memory (ROM) 281 and a random access memory (RAM) 283. A basic input/output system (BIOS) 282, containing the basic routines that help transfer information between elements within the PDA 200, such as during start-up, may be stored in the ROM 281. A video display 210 or other type of display device may also be connected to system bus 210 via an interface, such as a video adapter.

The PDA 200 may further include a hard disk drive 260 for reading from and writing to a hard disk. The hard disk drive 260 may be connected to the system bus 240 by a hard disk drive interface 250. The drives and their associated computer-readable media may provide nonvolatile storage of computer-readable instructions, data structures, program modules and other data for the PDA 200.

The PDA 200 may further include computer-readable media that may be accessed by the CPU 220. For example, such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the CPU 220.

The PDA 200 may contain a communication interface 270 that may connect with other types of computer media such as servers, computers, the Internet, databases, and the like. In one implementation, the communication interface 270 may be a Bluetooth communications interface. However, it should be understood that some implementations may use other types of wired or wireless communications.

Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. Combinations of any of the above may also be included within the scope of computer readable media.

A number of program modules may be stored on ROM 281 or RAM 283, including an operating system 284, a component locator program 286 and a component information program 288. The operating system 284 may be any suitable operating system that may control the operation of a networked personal or server computer, such as Windows® XP, Mac OS® X, Unix-variants (e.g., Linux® and BSD®), and the like. In one implementation, the component information program 288 may be stored on RAM 225 or hard disk drive 227. The component information program 240 may be used to outline and store information about certain components such as its identification number, size, location, pressure, etc. The component information program 240 may also be configured to initiate the component locator program 286 to store or locate specific LDAR components.

The PDA 200 may further include a position coordinate device 230, which may provide the component locator program 286 the current position coordinates of the PDA 200. The position coordinates device 230 may include an antenna, tuned to the frequency of the position satellites, receiver processors, a clock, and other components that may be used to interface with the PDA 200 and the position coordinates satellite 110. In one implementation, the component locator program 286 may use the position coordinates provided by the position device 230 to create a database of position coordinates for each LDAR component. The component locator program 286 will be described in more detail with reference to FIG. 3 and FIG. 4 in the paragraphs below. Although FIG. 2 indicates that the position coordinate device 230 may be integrated into the PDA 140, it should be noted that in other implementations the position coordinate device 230 may be a separate component that communicates with the PDA 140 over the PDA's communication interface 270.

Figure 3:
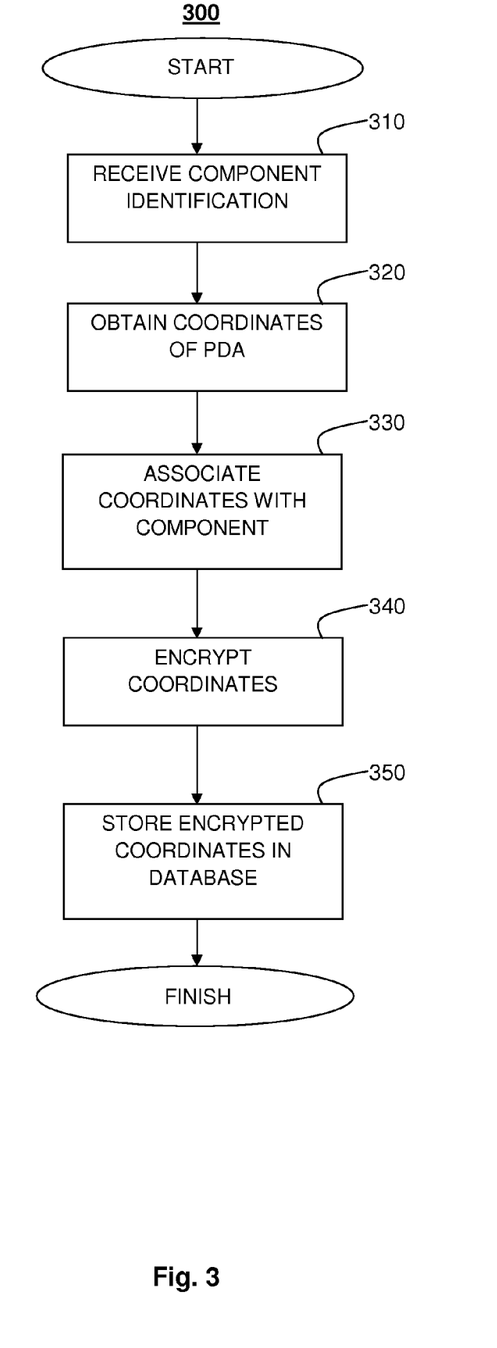
FIG. 3 illustrates a flow diagram of a method for creating a database of position coordinates for LDAR components in accordance with one or more implementations of various techniques described herein.

FIG. 3 illustrates a flow diagram of a method 300 for creating a database of position coordinates of LDAR components 170 in accordance with one or more implementations of various techniques described herein. At step 310, a user may input an LDAR component's identification information into the PDA 140. The component's identification information may reflect its attached tag number, serial number, or any other unique identification name that may or may not be physically attached to the actual LDAR component.

Upon receipt of the component's identification information, the component locator program 286 may obtain the current position coordinates of the PDA 140 (step 320). In doing so, the component locator program 286 may send a command to the position coordinates device 230 to retrieve the current position coordinates of PDA 140. Here, the position coordinates device 230 may interface with the position coordinates satellite 110 to locate and store the exact position coordinates of the PDA 140. The obtained coordinates may be stored in memory 280, hard drive 260, or any other memory storage device.

Although the component locator program 286 is described as obtaining position coordinates of the PDA 140 upon receipt of the LDAR component identification information, it should be understood that in some implementations, the component locator program 286 may obtain position coordinates of the PDA 140 at times other than receiving a component's identification. For instance, the component locator program 286 may obtain position coordinates of the PDA 140 when the user performs normal maintenance operations, such as monitoring, servicing, collecting data on a specific component, and the like. The component locator program 286 may also be programmed to automatically store the position coordinates of an LDAR component when a monitoring event is recorded or when a tag is documented into the PDA. Furthermore, it should be noted that the component locator program 286 may also be configured to store the position coordinates of a specific landmark, such as a control room, intersection, or major piece of equipment.

At step 330, the component locator program 286 associates the position coordinates of PDA 140 with the component identification information received at step 310. In this manner, the position coordinates of the LDAR component for which the identification information is received at step 310 may be obtained.

At step 340, the component locator program 286 may encrypt the position coordinates. In one implementation, the component locator program 286 may also encrypt the link or association between the specific component identification number and its position coordinates. Various encryption methods may be used by the component locator program 286 to keep the position coordinates of the LDAR components invisible to the public.

At step 350, the component locator program 286 may store the encrypted position coordinates into the position coordinates database 160. Notably, the position coordinates database 160 is separate from the database 150 that stores other information about LDAR components. The component locator program 286 may use the communication interface 270 to send the encrypted data to the position coordinate database 160.

Figure 4:
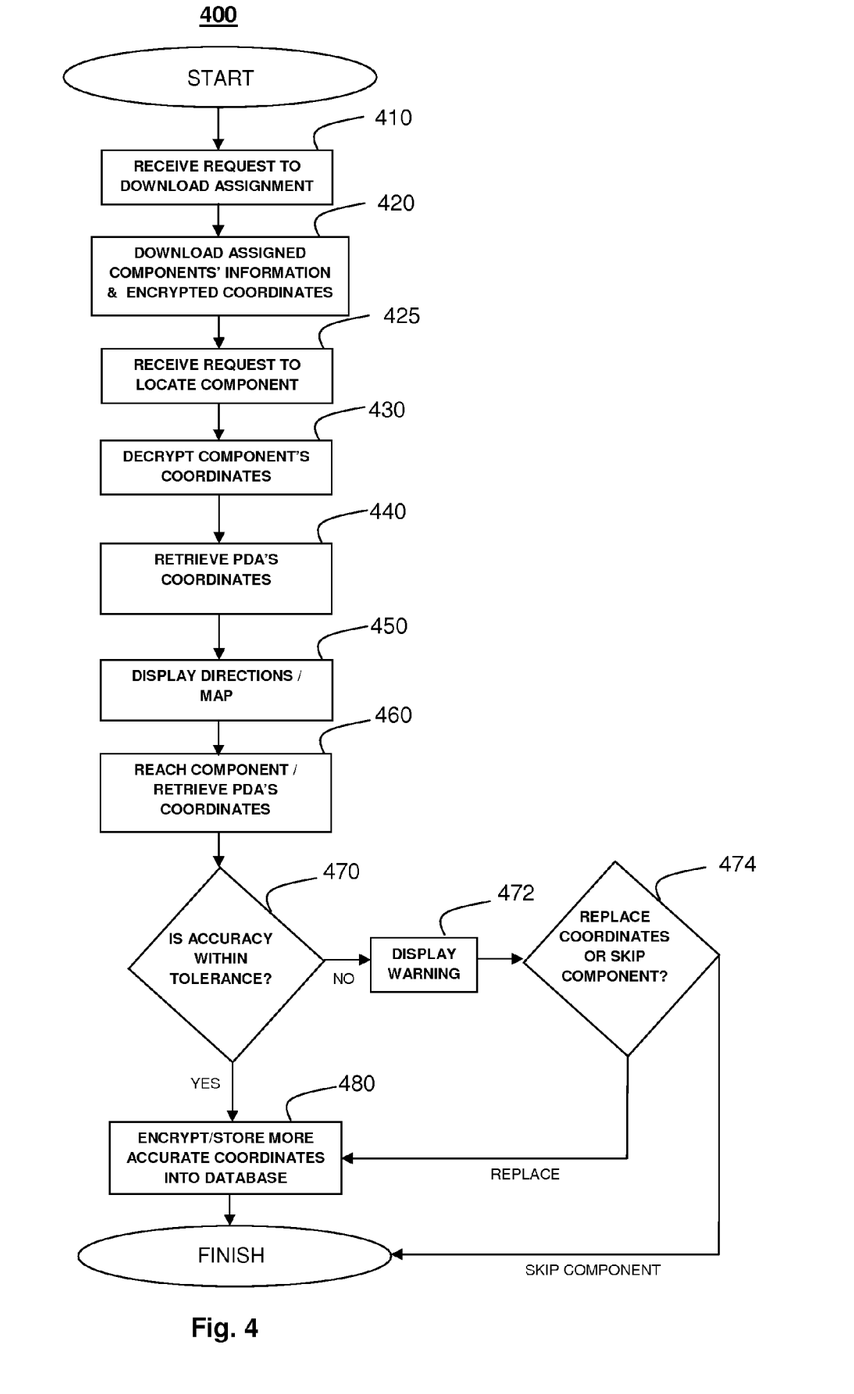
FIG. 4 illustrates a flow diagram of a method for assisting a user to locate an LDAR component in accordance with various techniques described herein.

FIG. 4 illustrates a flow diagram of a method 400 for assisting a user to locate an LDAR component in accordance with various techniques described herein. At step 410, the component locator program 286 may receive a request from a user to download the user's assignment.

At step 420, the component locator program 286 may retrieve the user's assignment, the information pertaining to the LDAR components listed in his assignment from the LDAR information database 150 and the corresponding encrypted position coordinates from the position coordinates database 160.

At step 425, the component locator program 286 may receive a request from a user to locate a specific LDAR component from his assignment list.

At step 430, the component locator program 286 may decrypt the retrieved encrypted position coordinates. The component locator program 286 may decrypt the encrypted coordinates using a decryption algorithm or another similar decryption method.

At step 440, the component locator program 286 may send a command to the position coordinates device 230 to retrieve the current position coordinates of the PDA 140. As mentioned above, the position coordinates device 230 may interface with one or more position coordinates satellites to determine the current position of PDA 140. In one implementation, the position coordinates device 230 may store the position coordinates of the PDA 140 on some memory device that may be accessed by the component locator program 286.

At step 450, the component locator program 286 may use the current position coordinates of PDA 140 and the decrypted position coordinates of the specified LDAR component to provide directions from the PDA 140's current location to the location of the specified LDAR component. The directions provided by the component locator program 286 may include a heading and distance, a general area map, a map of the area or facility in which the specified LDAR component is identified with a pointer, a snapshot view map that indicates the general direction and distance to the specified component, travelogues, vocal directions, written directions, video presentation and the like. Although it may be understood that the video display 210 may update automatically to indicate the PDA 140's progress in reaching the specified component, it should also be noted that directions displayed on the video display 210 may not update automatically as the PDA 140 moves closer to the specified LDAR component. Instead, the user may need to enter another request to the component locator program 286 to locate the specified LDAR component, in order for the video display 210 to update. In one implementation, the actual position coordinates of the LDAR component are never displayed to the user.

Once the user has physically reached the specified vicinity of the LDAR component's location, the user may perform various tasks, such as monitor, document, collect data, and the like. Upon completion of his tasks, the user may request to update or confirm the position coordinates of the LDAR component. In one implementation, such request may take place when the user presses the ENTER key on the PDA 140. As such, at step 460, upon receipt of the request to update the position coordinates of the LDAR component, the component locator program 286 may once again obtain the position coordinates of the PDA 140. In another implementation, at step 460, upon completion of his tasks, the user may record the task that he completed into the component information program 288. Once an LDAR component is updated on the component information program 288, the component information program 288 may automatically send a command to the component locator program 286 to retrieve the PDA 140's current position coordinates.

At step 470, the component locator program 286 may compare the PDA 140's current position coordinates recently obtained at step 460 with the previously decrypted position coordinates. Using the two position coordinates, the component locator program 286 may determine if the two sets of coordinates are within a predetermined accuracy tolerance. For example, the accuracy of the sets of coordinates may be determined by calculating the distance between the two coordinates. The predetermined accuracy tolerance may be a distance defined by the client, the user's supervisor, or the like.

At step 472, the component locator program 286 may display a warning notice to the user if the difference between the two position coordinates exceeds the predetermined tolerance. The warning notice may be displayed on the video display 210.

At step 474, the component locator program 286 may prompt the user to either replace the previous position coordinates associated with the LDAR component or disregard the warning. If the user selects the option to disregard the warning, then the component locator program 286 may await for its next request to locate another LDAR component.

On the other hand, if the user selects the option to replace the previous position coordinates with the current position coordinates, then at step 480, the component locator program 286 may encrypt and store the newly acquired position coordinates on the position coordinates database 160. As mentioned above, the component locator program 286 may also encrypt the link between the LDAR component identification information and its newly acquired position coordinates.

Referring back to step 470, if the difference between the two position coordinates falls within the predetermined tolerance, then at step 480, the component locator program 286 may encrypt and store the newly acquired position coordinates on the position coordinates database 160. In one implementation, if the newly acquired position coordinates have a higher degree of precision based on the dilution of precision value, the component locator program 286 may replace the previous coordinates with the newly acquired coordinates in the position coordinates database 160.

Referring back to step 474, if the user selects the option to replace the previous position coordinates with the newly acquired position coordinates, then the component locator program 286 may encrypt and store the newly acquired position coordinates on the position coordinates database 160. After the component locator program 286 encrypts and stores the newly acquired position coordinates, it may await for its next request to locate another LDAR component.

In one implementation, the component locator program 286 may not display a warning notice at step 472 if the difference between the two position coordinates exceeds the predetermined tolerance. Instead, the component locator program 286 may report the discrepancy on a separate database for quality assurance purposes. The quality assurance information may verify whether the user was in fact in the vicinity of the LDAR component that he was monitoring, documenting, or updating.

In another implementation, the component locator program 286 may create a separate file that keeps record of the user's completed tasks. For instance, the component locator program 286 may list the LDAR component that was monitored, the time and date it was monitored, and the LDAR components dilution of precision value. Using this information, the component locator program 286 may generate information outlining the user's route/path, his pace, his activities, his periods of inactivity, and the like.

While the foregoing is directed to implementations of various technologies described herein, other and further implementations may be devised without departing from the basic scope thereof, which may be determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for creating a database of coordinates of leak detection and repair (LDAR) components, comprising:
   receiving an input pertaining to an LDAR component;
   obtaining position coordinates of a handheld computer device in response to receiving the input;
   associating the position coordinates of the handheld computer device with the LDAR component; and
   storing the position coordinates in association with the LDAR component into a database.

2. The method of claim 1, wherein associating the position coordinates comprises associating the position coordinates of the handheld computer device with a unique identifier of the LDAR component.

3. The method of claim 1, wherein the position coordinates are Global Positioning System coordinates.

4. The method of claim 1, wherein obtaining the position coordinates comprises determining the position coordinates from one or more position coordinates satellites.

5. The method of claim 1, further comprising encrypting the position coordinates.

6. The method of claim 1, further comprising encrypting the association between the position coordinates of the handheld computer device and the LDAR component.

7. The method of claim 1, wherein the database that stores the position coordinates is separate from a database that stores other information about the LDAR component.

8. A method for providing assistance to a user for locating a leak detection and repair (LDAR) component, comprising:
   receiving a request to locate an LDAR component in a field;
   retrieving position coordinates of the LDAR component;
   obtaining position coordinates of a handheld computer device; and
   displaying directions on the handheld computer device, wherein the directions are from the position coordinates of the handheld computer device to the position coordinates of the LDAR component.

9. The method of claim 8, wherein the position coordinates of the LDAR component are encrypted and further comprising decrypting the encrypted position coordinates.

10. The method of claim 8, wherein the directions comprise a heading and distance, a map, a video presentation, a travelogue map, vocal instructions, text or combinations thereof.

11. The method of claim 8, wherein the directions are provided displayed without displaying the position coordinates of the LDAR component.

12. The method of claim 8, wherein displaying the directions comprises providing directions to the vicinity of the LDAR component.

13. The method of claim 8, wherein the position coordinates of the handheld device or the LDAR component are Global Positioning System (GPS) coordinates obtained from one or more GPS satellites or cellular phone towers.

14. The method of claim 8, further comprising:
   obtaining current position coordinates of the handheld computer device when the user has reached the LDAR component;
   comparing the current position coordinates of the handheld computer device with the retrieved position coordinates of the LDAR component; and
   displaying a warning message on the handheld computer device to the user if the difference between the current position coordinates of the handheld computer device and the retrieved position coordinates of the LDAR component exceeds a predetermined range.

15. The method of claim 14, further comprising providing the user with an option to either replace the position coordinates of the LDAR component with the current position coordinates of the handheld computer device if the difference between the current position coordinates of the handheld computer device and the retrieved position coordinates of the LDAR component exceeds a predetermined range.

16. The method of claim 8, further comprising:
   obtaining current position coordinates of the handheld computer device when the user has reached the LDAR component;
   determining whether the current position coordinates are within a predetermined range of the retrieved position coordinates of the LDAR component; and
   if it is determined that the current position coordinates are within the predetermined range, then replacing the retrieved position coordinates of the LDAR component with the current position coordinates.

17. The method of claim 8, further comprising:
   obtaining current position coordinates of the handheld computer device when the user has reached the LDAR component;
   determining whether the current position coordinates are within a predetermined range of the retrieved position coordinates of the LDAR component and whether the dilution of precision of the current position coordinates is higher than the dilution of precision of the retrieved position coordinates; and
   if it is determined that the current position coordinates are within the predetermined range and that the dilution of precision of the current position coordinates are higher than the dilution of precision of the retrieved position coordinates, then replacing the retrieved position coordinates of the LDAR component with the current position coordinates.

18. The method of claim 8, further comprising:
obtaining current position coordinates of the handheld computer device when the user has reached the LDAR component;
comparing the current position coordinates of the handheld computer device with the retrieved position coordinates of the LDAR component; and
if the difference between the current position coordinates of the handheld computer device and the retrieved position coordinates of the LDAR component exceeds a predetermined range, then sending a message regarding the difference to a database for quality assurances purposes.

19. A system for locating leak detection and repair (LDAR) components, comprising:
one or more position coordinates satellites; and
a handheld computer device in communication with the position coordinates satellite, wherein the handheld computer device comprises:
a processor; and
a memory comprising program instructions executable by the processor to:
receive an input pertaining to an LDAR component;
obtain position coordinates of the handheld computer device using the position coordinates satellites;
associate the position coordinates of the handheld computer device with the LDAR component;
store the position coordinates in association with the LDAR component into a database.

20. The system of claim 19, wherein the handheld computer device further comprises a position coordinates device configured to determine the position coordinates of the handheld computer device from the position coordinates satellites.

21. The system of claim 19, wherein the memory further comprises program instructions executable by the processor to encrypt the position coordinates.

22. A system for locating leak detection and repair (LDAR) components, comprising:
one or more position coordinates satellites; and
a handheld computer device in communication with the position coordinates satellite, wherein the handheld computer device comprises:
a processor; and
a memory comprising program instructions executable by the processor to:
receive a request to locate an LDAR component in a field;
retrieve position coordinates of the LDAR component in response to receiving the request;
obtain position coordinates of the handheld computer device using the one or more position coordinates satellites; and
display directions on the handheld computer device, wherein the directions are from the position coordinates of the handheld computer device to the position coordinates of the LDAR component.

23. The system of claim 22, wherein the handheld computer device further comprises a position coordinates device configured to determine the position coordinates of the handheld computer device from the one or more position coordinates satellites.

24. The system of claim 19, further comprising a position coordinates device configured to determine from the one or more position coordinates satellites the position coordinates of the handheld computer device, wherein the position coordinates device is in communication with the handheld computer device.

25. A method for tracking a technician in an industrial plant, comprising:
receiving one or more sets of position coordinates of a handheld computer device while the technician is performing a task for a leak detection and repair (LDAR) component disposed inside the industrial plant, wherein the handheld computer device is used by the technician to perform the task;
associating the one or more sets of position coordinates with the technician; and
storing the one or more sets of position coordinates automatically by the handheld computer device into a database while performing the task.

26. The method of claim 25, further comprising displaying a representation of the one or more sets of position coordinates on a computer screen.

27. The method of claim 25, wherein the one or more sets of position coordinates comprise a first set of position coordinates and a second set of position coordinates, wherein the second set of position coordinates is received after the first set of position coordinates is received, and further comprising displaying a first representation of the first set of position coordinates and a second representation of the second set of position coordinates, wherein the second set of position coordinates is different from the first set of position coordinates.

28. The method of claim 25, wherein the task comprises monitoring the LDAR component, servicing the LDAR component, collecting data from the LDAR component, documenting the LDAR component or combinations thereof.

* * * * *